(12) United States Patent
Ojima et al.

(10) Patent No.: US 6,874,751 B2
(45) Date of Patent: Apr. 5, 2005

(54) ELECTROMAGNETIC VALVE

(75) Inventors: Kouichi Ojima, Tokyo (JP); Kenji Nakao, Tokyo (JP); Hidehiro Soga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/443,868

(22) Filed: May 23, 2003

(65) Prior Publication Data

US 2004/0090296 A1 May 13, 2004

(30) Foreign Application Priority Data

Nov. 12, 2002 (JP) .......................................... 2002-327899

(51) Int. Cl.⁷ ...................... F02M 59/96; F02M 63/00; F16K 31/02
(52) U.S. Cl. ............... 251/129.15; 251/129.14; 335/257; 335/273; 335/277
(58) Field of Search ................. 335/255, 257, 335/261, 262, 271, 274, 277, 279, 281; 251/129.01, 129.08, 129.09, 129.1, 129.14, 129.15

(56) References Cited

U.S. PATENT DOCUMENTS

| 6,220,275 B1 * | 4/2001 | Nishinosono et al. ....... 137/238 |
| 6,679,475 B2 * | 1/2004 | Rembold et al. ......... 251/129.14 |

FOREIGN PATENT DOCUMENTS

| DE | 9 975 662 | 4/1962 |
| DE | 1 169 242 | 4/1964 |
| DE | 1 205 623 | 11/1965 |
| DE | 1 980 806 U | 3/1968 |
| DE | 37 00 540 A1 | 7/1988 |
| DE | 42 17 871 A1 | 12/1993 |
| DE | 44 05 915 A1 | 8/1995 |
| DE | 196 00 351 A1 | 7/1997 |
| DE | 196 11 886 A1 | 10/1997 |
| DE | 43 09 739 C2 | 7/1998 |
| DE | 295 21 959 U1 | 1/1999 |
| DE | 197 54 525 C1 | 4/1999 |
| DE | 198 18 126 A1 | 10/1999 |
| DE | 197 40 580 C2 | 6/2001 |
| DE | 101 24 338 A1 | 11/2002 |
| DE | 101 56 231 C1 | 4/2003 |
| JP | 02209683 A | 8/1990 |

* cited by examiner

Primary Examiner—Ramon M. Barrera
(74) Attorney, Agent, or Firm—Sughrue Mion, PLLC

(57) ABSTRACT

An electromagnetic valve (100) which can ensure a predetermined response behavior while sustaining a desired control performance with operation noise being suppressed even after operation over an extended time includes a plunger assembly (15) having a plunger (7), a coil (2) for driving the plunger (7), a fixed core (4) disposed in a direction in which the plunger (7) is displaced for attracting the plunger assembly (15) to a retracted position upon electrical energization of the coil (2) to thereby hold the plunger at that position, a resilient member (8) disposed, being compressed, between the plunger (7) and the fixed core (4) to resiliently urge the plunger assembly (15) to an advanced position, and a spacer (9; 39) interposed between the plunger (7) and the fixed core (4). The spacer (9; 29; 39; 49) is provided with a protrusion (9a; 29a).

7 Claims, 10 Drawing Sheets

ELECTROMAGNETIC VALVE

BACKGROUND OF THE INVENTION

1. Field of the Invention

The present invention relates to an electromagnetic valve (which may also be referred to as the solenoid valve or magnet valve) including a valve element which is driven to an opened or closed state by means of a plunger under the influence of a magnetic field generated by a coil upon electric energization thereof. More specifically, the present invention is concerned with an electromagnetic valve of a duty control type for controlling an amount or flow rate of a fluid flowing or passing through the valve by changing periodically a time period during which the coil is electrically energized.

2. Description of Related Art

In the electromagnetic valve including a valve element driven to an opened or closed state by means of a plunger under the influence of a magnetic field generated by a coil upon electrical energization thereof, there may arise such a situation in which the plunger continues to remain in the state contacting with a fixed core of the electromagnet due to an excessively large residual magnetic force even after the electric energization of the coil has been broken. As an attempt for avoiding such undesirable situation, there has already been proposed such a valve structure in which a spacer of a non-magnetic material is interposed between the plunger and the fixed core. For more particulars, reference may have to be made to, for example, Japanese Utility Model Registration Publication No. 38779/1995.

In the hitherto known electromagnetic valve of the structure such as mentioned above, the surface of the spacer which faces oppositely to the plunger is formed flatly. Consequently, the areas over which the spacer is brought into contact with the plunger and the fixed core, respectively, are large. In the spacer of this type, intimacy or affinity, so to say, will occur in the spacer portion which is brought into contact with the plunger, being accompanied with increase of the contact area, due to deformation and abrasion of the spacer brought about by repetitive application of an impulsive force when the electromagnetic valve is operated over an extended time. When such affinity becomes remarkable, cohesion taking place between the contacting surfaces of the spacer and the plunger increases particularly at a low temperature at which the viscosity of the fluid under control is large. The increase of the cohesion in turn involves a lag in the response behavior of the electromagnetic valve in particular upon interruption of the electrical energization, giving rise to a problem.

This problem is serious particularly in the electromagnetic valve of a duty control type in which the amount or flow rate of a fluid flowing through the valve is controlled by changing the timings at which the valve element is driven to opened and closed states by changing the time durations of electric energization and deenergization of the coil repeated periodically, because the control function or performance of the duty control type electromagnetic valve may then be degraded considerably. Furthermore, increasing of the contact area between the spacer and the plunger tends to increase the operation noise of the electromagnetic valve, giving rise to another problem.

SUMMARY OF THE INVENTION

In the light of the state of the art described above, it is an object of the present invention to provide an electromagnetic valve which can maintain a predetermined response performance and which thus can ensure desired control performance even after the operation for an extended time.

Another object of the present invention is to provide the electromagnetic valve in which the operation noise can significantly be suppressed.

In view of the above and other objects which will become apparent as the description proceeds, there is provided according to a general aspect of the present invention an electromagnetic valve which includes a valve seat assembly having an intake port, a discharge port, a fluid passage formed between the intake port and the discharge port and a valve seat provided in association with the fluid passage, a plunger assembly comprised of a plunger disposed reciprocatively slideably within a cylindrical hollow chamber and a valve element provided at one end of the plunger for opening and closing the fluid passage in cooperation with the valve seat, a coil for driving the plunger to displace the plunger assembly, a fixed core disposed in a direction in which the plunger is displaced for attracting the plunger to a retracted position upon electrical energization of the coil to hold the plunger at the retracted position, a resilient member disposed in a compressed state between the plunger and the fixed core to resiliently urge the plunger assembly to an advanced position, and a spacer interposed between the plunger and the fixed core, the spacer being provided with a protrusion.

By virtue of the arrangement described above in which the spacer is provided with the protrusion, the contact area between the spacer and the plunger can be reduced. Besides, even after the electromagnetic valve has been put into operation over an extended time, the affinity of the contacting surfaces can effectively be suppressed. By virtue of these features, the response performance of the electromagnetic valve upon electric deenergization of the electromagnetic valve can be protected against deterioration. Further, the operation noise can effectively be suppressed. Besides, the electromagnetic valve can be implemented as a duty control type electromagnetic valve for controlling an amount of the fluid flowing through the valve by changing the time durations of the electrical energization and deenergization, respectively, of the coil repeated periodically while preventing the control performance of the electromagnetic valve from deterioration.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
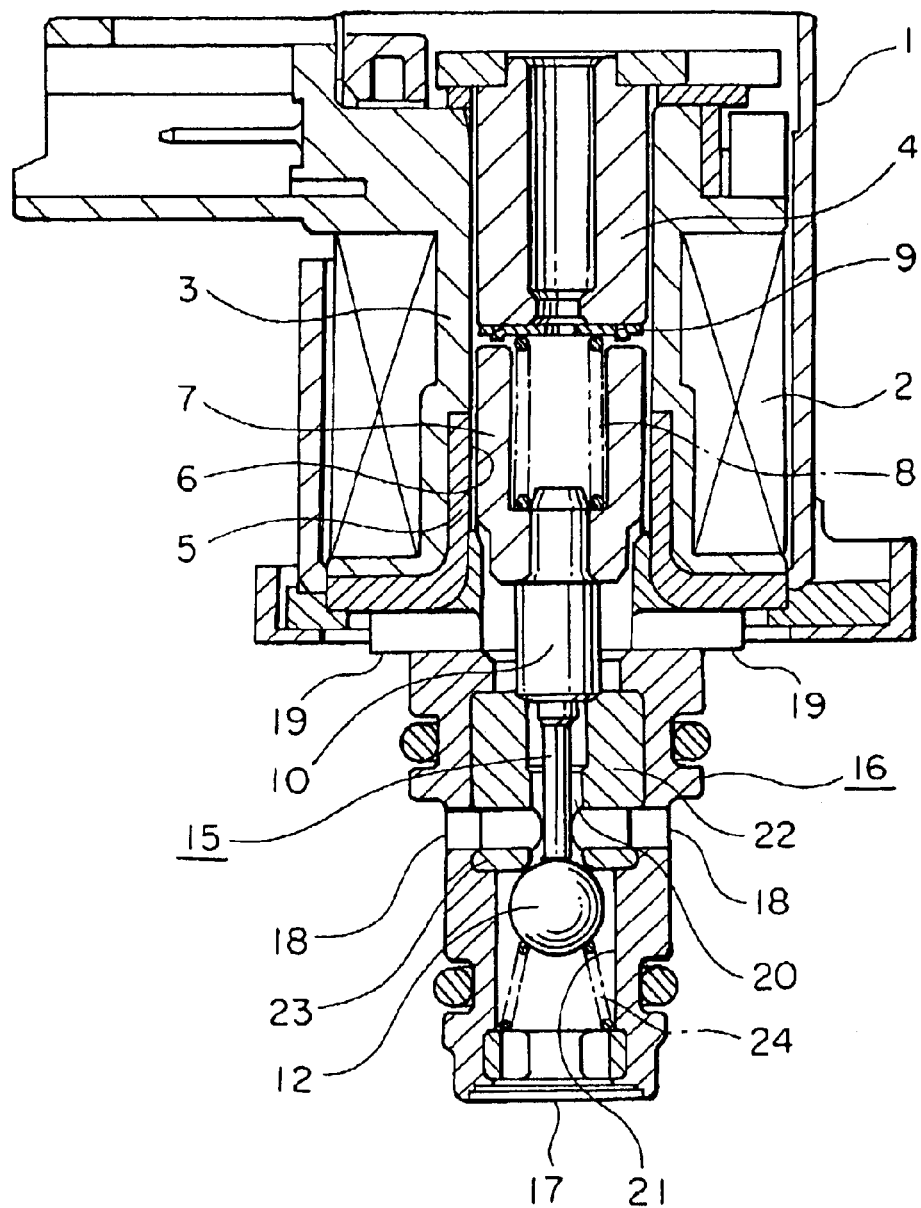
FIG. 1 is a view showing particularly in section an electromagnetic valve according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a sectional view of the electromagnetic valve according to a first embodiment of the present invention. Referring to the figure, the electromagnetic valve denoted generally by reference numeral 100 is comprised of a case 1 formed of a magnetic material and serving for armoring the electromagnetic valve 100, a coil 2 wound in a cylindrical shape and housed within the case 1, a bobbin 3 formed of a resin material substantially in a spool-like shape, having an outer peripheral surface around which the coil 2 is wound and a longitudinal cylindrical through-hole at the center thereof, a cylindrical thick core 4 fixedly secured to the case 1 at one end and having other end portion extending to a mid portion of the above-mentioned longitudinal through-hole formed in the bobbin 3, a plate 5 formed of a magnetic material and having a cylindrical portion fit into the through-hole of the bobbin 3 in opposition to the fixed core 4 and a disk-like portion extending radially from the lower end of the cylindrical portion in the outer peripheral direction along a collar surface of the bobbin 3, a plunger 7 formed of a magnetic material substantially in a cylindrical form and disposed reciprocatively slideably within the hollow cylindrical plunger chamber 6 defined by the through-hole of the bobbin 3, the cylindrical portion of the plate 5 and an end face of the fixed core 4, being positioned in a flux path extending through the plate 5 and the fixed core 4 so as to be attracted to the end face of the fixed core 4 under an attracting force generated in the fixed core 4 upon electrical energization of the coil 2, a spring 8 disposed in the compressed state between the plunger 7 and the fixed core 4 for resiliently urging the plunger 7 in the direction opposite to the fixed core 4, and a disk-like spacer 9 formed of a non-magnetic material and disposed as sandwiched (i.e., interposed) between the plunger 7 and the fixed core 4.

The spacer 9 is disposed for the purpose of preventing the plunger 7 and the fixed core 4 from unseparably sticking to each other under the influence of an excessively large residual magnetic force.

A first valve element 10 of a column-like shape is fixedly press-fit into the end portion of the plunger 7 on the side opposite to the fixed core 4. The plunger 7 and the first valve element 10 are fabricated in an integral structure to thereby constitute a plunger assembly 15. A second valve element 12 of a ball-like shape is disposed in contact with a tip end of the plunger assembly 15.

The electromagnetic valve 100 further includes a valve seat assembly 16 which includes by a first valve seat 22 and a second valve seat 23 formed of a resin in an integral structure and mounted on the bobbin 3 on the side opposite to the fixed core 4. Incidentally, the valve seat assembly 16 and the bobbin 3 may be formed integrally. The valve seat assembly 16 is provided with an inlet port (first port) 17, an outlet port (second port) 18 and a discharge port (third port) 19. Further formed in the valve seat assembly 16 are a first fluid passage 20 which extends between the outlet or second port 18 and the discharge or third port 19 and a second fluid passage 21 which extends between the inlet or first port 17 and the outlet or second port 18.

Further, a first valve seat 22 is provided in association with the first fluid passage 20 at an intermediate portion thereof. The first valve element 10 mentioned previously is adapted to cooperate with the first valve seat 22 to open and close the first fluid passage 20. Similarly, a second valve seat 23 is provided in association with the second fluid passage 21 at an intermediate portion thereof. The second valve element 12 mentioned above is adapted to cooperate with the second valve seat 23 to open and close the second fluid passage 21. A spring 24 is disposed in a compressed state, between the inlet or first port 17 and the second valve element 12 to resiliently urge the second valve element 12 toward the valve seat 23 and the plunger assembly 15.

Figure 2:
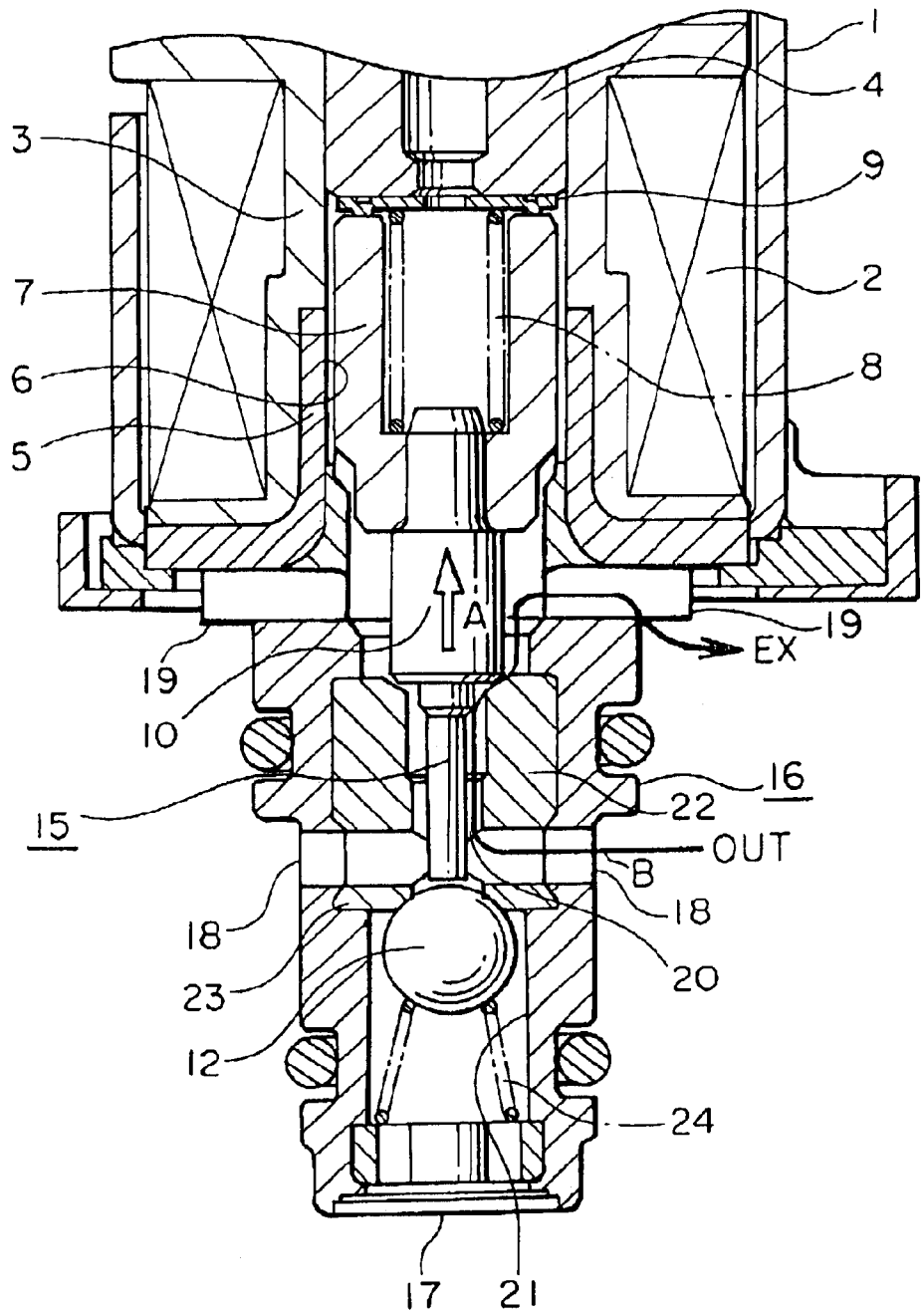
FIG. 2 is a sectional view showing the electromagnetic valve in a state in which a plunger assembly of the electromagnetic valve shown in FIG. 1 is at a retracted position.

Next, description will be directed to the operation of the electromagnetic valve according to the first embodiment of the invention implemented in the structure described above. FIG. 2 is a sectional view showing the electromagnetic valve in the state in which the plunger assembly 15 is at a retracted position. Upon electric energization of the coil 2, the plunger 7 is attracted to the fixed core 4 under the action of a magnetic attracting force of the fixed core 4, as indicated by a hollow arrow A in FIG. 2, as a result of which the plunger 7 and the spacer 9 are caused to contact closely with each other. At this time point, the first valve element 10 is caused to detach from the first valve seat 22, whereby the first fluid passage 20 is opened. On the other hand, the tip end of the first valve element 10 is caused to detach from the second valve element 22, which results in that the second valve element 12 is brought into close contact with the second valve seat 23 under the influence of the fluid flow and the spring 24. Consequently, the second fluid passage 21 is blocked by the second valve element 12. As a result of this, the fluid flows from the outlet or second port (OUT) through the discharge or third port 19 to the exhaust (EX) side, as indicated by a solid arrow B in FIG. 2. Thus, the pressure on the output (OUT) side becomes lowered. In this operation, the outlet or second port 18 serves as an inlet or intake port.

At this juncture, it should be mentioned that the electromagnetic valve 100 according to the instant embodiment of the present invention is implemented in the form of a three-way electromagnetic valve including a combination of the first valve element 10 and the first valve sheet 22 and a combination of the second valve element 12 and the second valve sheet 23 and provided with the inlet or first port 17, the outlet or second port 18 (serving also as the inlet port) and the discharge or third port 19. However, it must be pointed out that the present invention is never restricted to the three-way electromagnetic valve such as mentioned above but can equally find application to a two-way electromagnetic valve of a structure in which the inlet or first port 17 and the combination of the second valve element 12 and the second valve sheet 23 are spared from the electromagnetic valve 100 described above.

Figure 3:
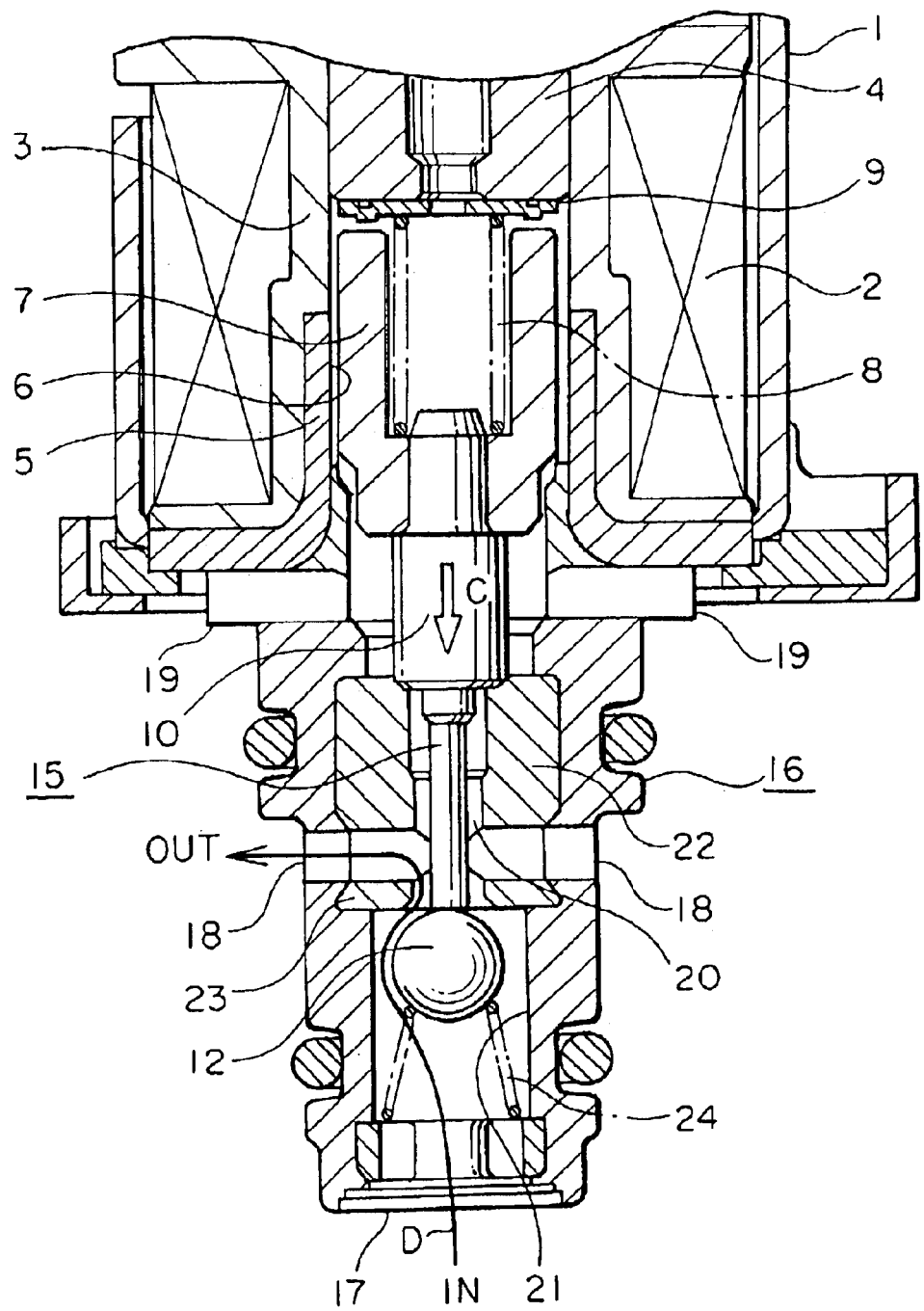
FIG. 3 is a sectional view showing the electromagnetic valve in a state where the plunger assembly of the electromagnetic valve shown in FIG. 1 is advanced.

FIG. 3 is a sectional view showing the electromagnetic valve in the state where the plunger assembly 15 is advanced or projected. Upon deenergization of the coil 2, the plunger assembly 15 is forced to move toward the second valve element 12 under the influence of the restoring force of the spring 8, whereby the first valve element 10 is caused to bear against the first valve seat 22. At that time point, the first valve element 10 is placed in tight contact with the first valve seat 22, which results in that the first fluid passage 20 is blocked. On the other hand, the second valve element 12 is forced to move away from the second valve seat 23, whereby the second fluid passage 21 is opened. As a result of this, the fluid can flow from the inlet or first port (IN) through the outlet port (OUT), as indicated by a solid arrow D in FIG. 3. Thus, the pressure on the outlet (OUT) side increases.

With the electromagnetic valve of the duty control type which operates in the manner described above, the flow rate or amount of the fluid passing through the electromagnetic valve can be controlled by changing the time duration of the electric energization and deenergization of the coil repeated periodically to thereby change correspondingly the flow of the fluid flowing through the electromagnetic valve. In this way, the fluid pressure on the outlet (OUT) side can be controlled as well.

Figure 4:
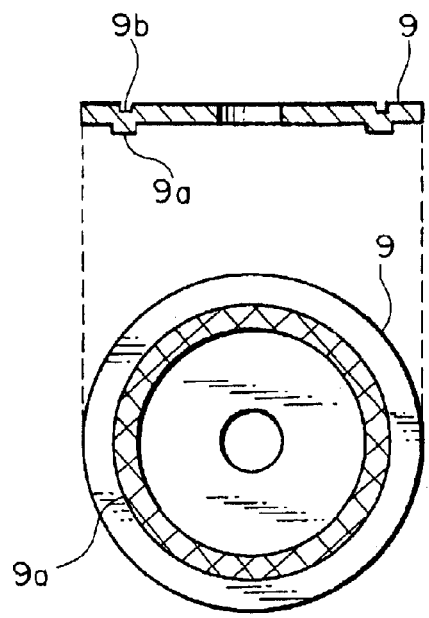
FIG. 4 is a view illustrating a geometrical structure of a spacer employed in the electromagnetic valve shown in FIG. 1.
Figure 5:
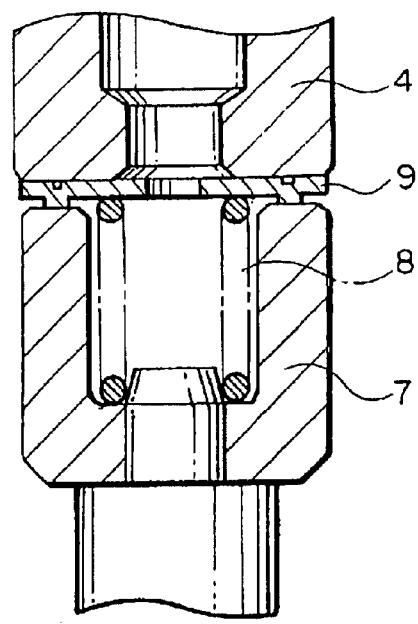
FIG. 5 is an enlarged view of a portion of the electromagnetic valve shown in FIG. 1 in the vicinity of the spacer.

FIG. 4 is a view for illustrating a geometrical configuration of the spacer 9 employed in the electromagnetic valve shown in FIG. 1. FIG. 5 is an enlarged view of a portion of the electromagnetic valve in the vicinity of the spacer 9. Referring to the figures, a first surface of the spacer 9 located on the side of the plunger 7 is formed with an annular convex portion 9a which extends along the whole circumference about the center of the spacer 9. On the other hand, a second surface of the spacer 9 located on the side of the fixed core 4 is formed with an annular concave portion 9b at a position corresponding to that of the convex portion 9a. By implementing the spacer 9 in the structure having the circular protrusion formed by the convex portion 9a, the contact area between the spacer 9 and the plunger 7 can be reduced. Besides, the intimacy or affinity of the contacting surfaces can be prevented from increasing even after the operation over an extended time period. By way of example, even at a low temperature, the cohesion or stickiness between the contacting surfaces of the plunger 7 and the spacer 9 is low as compared with the conventional electromagnetic valve. Thus, the response performance of the electromagnetic valve upon deenergization is protected against degradation with the control performance or capability thereof being prevented from deterioration.

Furthermore, in the electromagnetic valve according to the instant embodiment of the invention, the concave portion 9b is formed in the back or rear surface of the spacer 9 in opposition to the convex portion 9a so that the convex portion 9a exhibits a proper elasticity in the direction in which the plunger assembly 15 moves. Owing to this arrangement, the convex portion 9a undergoes a fine elastic deformation upon collision of the plunger 7 to the spacer 9. Thus, the so-called damping effect is realized, which contributes to reduction of operation noise.

Figure 6:
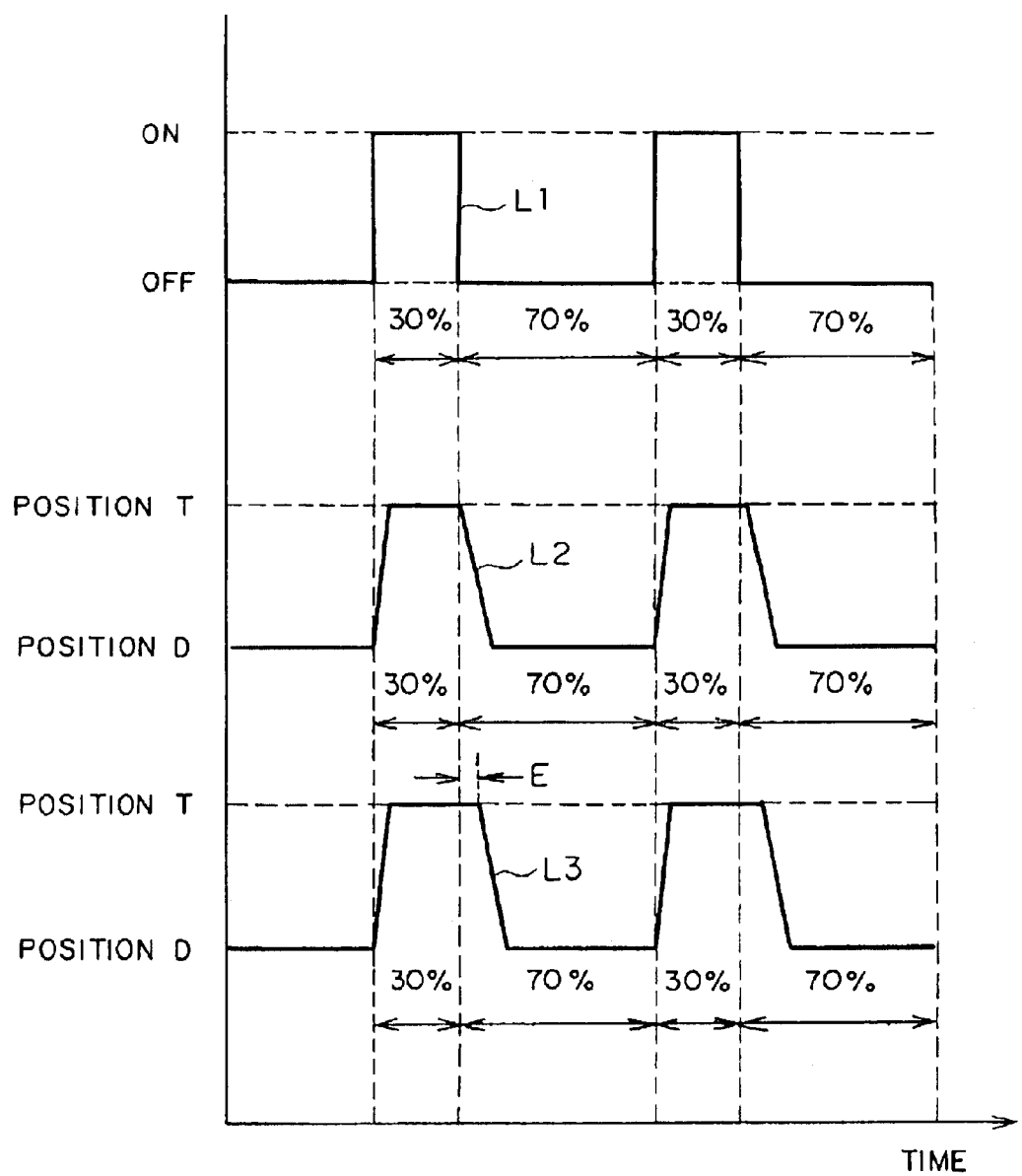
FIG. 6 is a view for graphically illustrating a relation between a control signal and a plunger position immediately after start of operation of the electromagnetic valve shown in FIG. 1 and after operation thereof over an extended time period.

FIG. 6 is a view for graphically illustrating relations between the control signal and the plunger position immediately after the start of operation and after the operation over an extended time period. In FIG. 6, a curve L1 shown at the top row represents the control signal applied to the coil 2 on the presumption that the off-duty ratio is 70%. Further, a curve L2 shown at the mid row represents the behavior of the plunger 7 immediately after the start of operation of the electromagnetic valve according to the instant embodiment of the invention and after the operation thereof over an extended time period. In the figure, a position T indicates the state in which the plunger assembly 15 is at the retracted position, i.e., the state in which the plunger 7 and the spacer 9 are in contact with each other, while a position D indicates the state in which the plunger assembly 15 is at the advanced or projected position, i.e., the state in which the first valve element 10 bears on or against the first valve seat 22. Further, a curve L3 shown at the bottom row in FIG. 6 represents the behavior of the plunger 7 of the conventional electromagnetic valve after operation over an extended time period.

Figure 7:
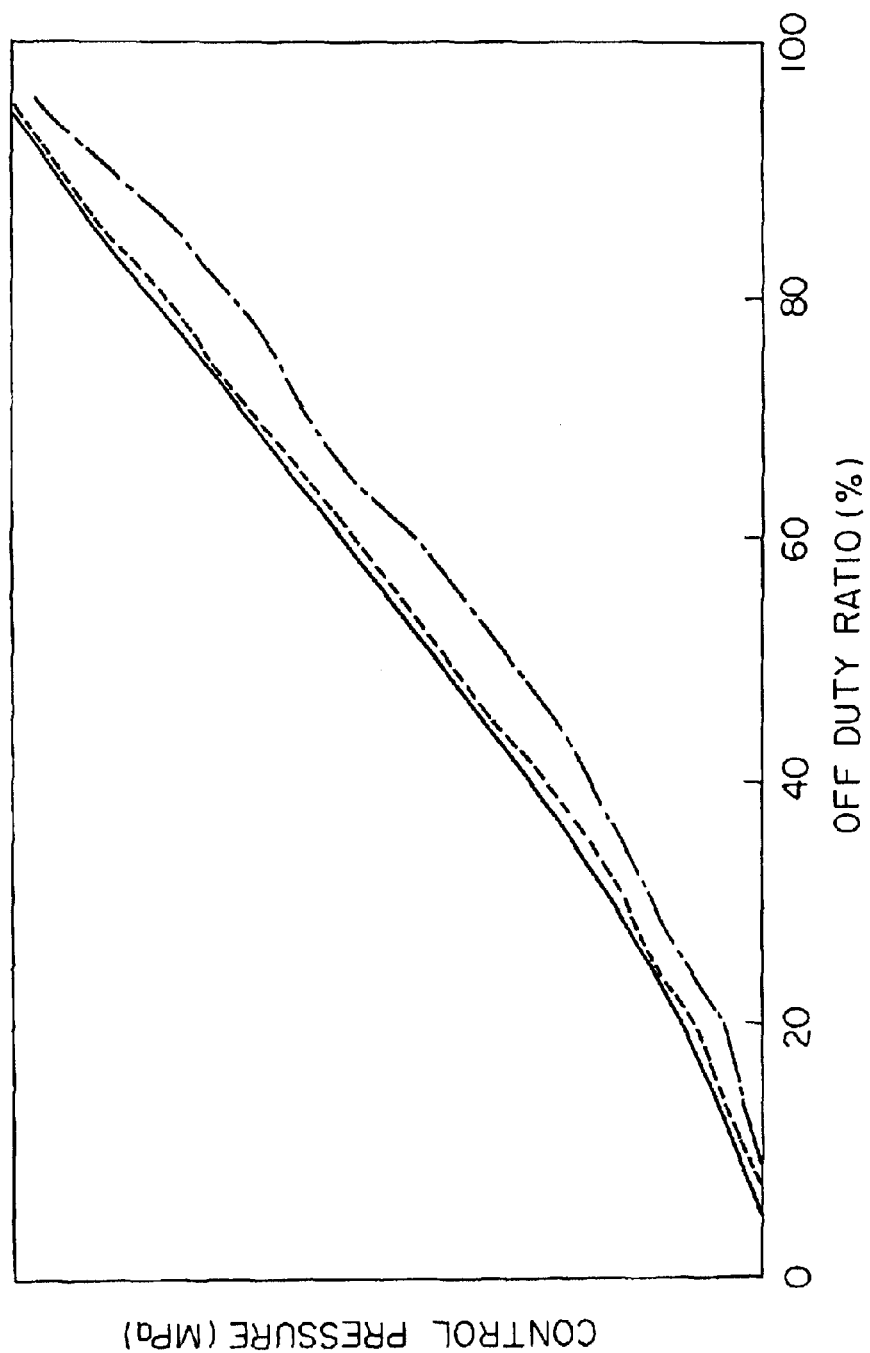
FIG. 7 is a view for graphically illustrating relations between off-duty ratio and controlled pressure immediately after the start of operation of the electromagnetic valve shown in FIG. 1 and after operation thereof over an extended time period.

FIG. 7 is a view for graphically illustrating the relations between the off-duty ratio and the controlled pressure immediately after the start of operation and after the operation over an extended time period, respectively. More specifically, in FIG. 7, a solid line curve represents a relation between the off-duty ratio and the controlled pressure immediately after the start of operation, and a broken-line curve represents a relation between the off-duty ratio and the controlled pressure after the operation over an extended time period in the electromagnetic valve according to the instant embodiment of the invention. On the other hand, a single-dotted line curve represents a relation between the off-duty ratio and the controlled pressure of the conventional electromagnetic valve after the operation over an extended time period.

As can be seen in FIG. 6, when the time duration of deenergization is long (i.e., when the off-duty ratio is high), the pressure (controlled pressure) at the outlet or second port (OUT) side increases. On the contrary, when the time duration of deenergization is short, the pressure (controlled pressure) at the outlet or second port (OUT) side is low. In this conjunction, it is noted that in the case of the conventional electromagnetic valve, the spacer 9 undergoes deformation and abrasion due to repetitive striking operation of the plunger 7 after the operation over an extended period, as a result of which the intimacy or affinity of the spacer (increase of the contact area) becomes remarkable. Consequently, particularly at a low temperature, the viscosity of the control fluid increases, as a result of which the cohesion brought about between the contact surfaces by the control fluid increases, which in turn brings about a response time lag upon deenergization in particular. In FIG. 6, a time span E represents the time lag in the plunger operation upon deenergization.

When the plunger operation is accompanied with the time lag as described above, the actual valve open time increases, as a result of which the amount of fluid flowing from the outlet (OUT) side to the discharge (EX) side increases with the controlled pressure becoming lower than the target level, as can be seen in FIG. 7.

As is apparent from the above description, the electromagnetic valve 100 according to the instant embodiment of the invention incorporates the spacer 9 having the circular protrusion and adapted to be sandwiched between the plunger 7 and the fixed core 4. Thus, the contact area between the spacer 9 and the plunger 7 can be reduced. Besides, the intimacy or affinity of the contacting surfaces can be prevented from increasing even after the operation over an extended time period. Consequently, the response performance of the electromagnetic valve upon deenergization is protected against degradation with the control performance or capability thereof being prevented from deterioration. Additionally, operation noise can be reduced. Further, even in the case where the electromagnetic valve 100 is of the duty control type in which the amount or flow of the fluid passing through the valve is controlled by changing the time durations of the energization and deenergization of the coil 2 repeated periodically, the control performance can be protected against deterioration.

Embodiment 2

Figure 8:
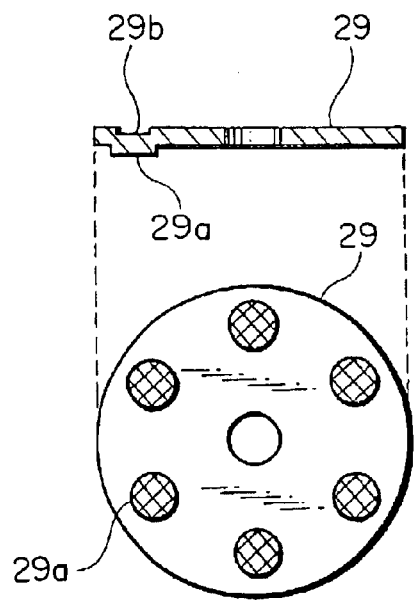
FIG. 8 is a view showing a shape of the spacer employed in the electromagnetic valve according to a second embodiment of the present invention.
Figure 9:
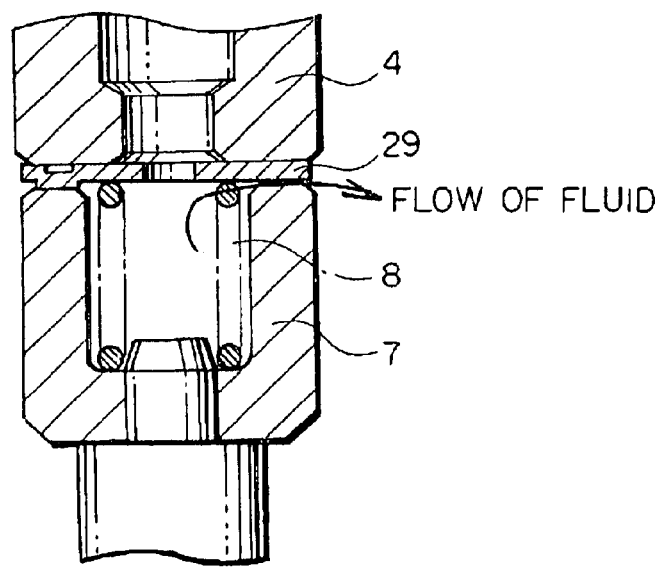
FIG. 9 is an enlarged view showing a portion of the electromagnetic valve according to the second embodiment of the present invention in the vicinity of the spacer in the state where the electromagnetic valve is electrically energized.

FIG. 8 is a view showing the shape of a spacer employed in the electromagnetic valve according to a second embodiment of the present invention. FIG. 9 is an enlarged view showing a portion of the electromagnetic valve in the vicinity of the spacer in the state in which the electromagnetic valve is electrically energized. In the electromagnetic valve according to the instant embodiment of the invention, the protrusion provided on the spacer denoted by numeral 29 in the instant embodiment is implemented in the form of a circular boss array in which six circular boss portions 29a are discretely formed in the first or front surface of the spacer 29 on the side of the plunger 7 with equidistance therebetween in a circumferential direction, as can be seen in FIG. 8. On the other hand, in the second or rear surface of the spacer 29 located adjacent to the fixed core 4, there are formed six dimple portions 29b at the positions which correspond to those of the boss portions 29a, respectively.

By virtue of the structure of the spacer 29 in which the boss portions 29a are discretely or discontinuously formed along the circumferential direction in the first surface of the spacer 29 which is located in opposition to the plunger 7, as described above, fluid flow can take place from the interior of the plunger 7 to the exterior thereof by way of gaps defined between adjacent boss portions 29a, as indicated by a solid arrow. Owing to this feature, the plunger 7 can be detached more easily from the spacer 29, which means that the response behavior of the electromagnetic valve can further be improved.

Furthermore, in the electromagnetic valve according to the instant embodiment of the invention, the dimple portions 29b are formed in the rear surface of the boss portion 29a so that each boss portion 29a exhibits appropriate elasticity, similarly to the case described previously in conjunction with the first embodiment of the invention. Owing to this arrangement, the boss portion 29a undergoes fine elastic deformation upon collision of the plunger 7 to the spacer 29. Thus, the so-called damping effect is realized, which contributes to reduction of the operation noise.

Embodiment 3

Figure 10:
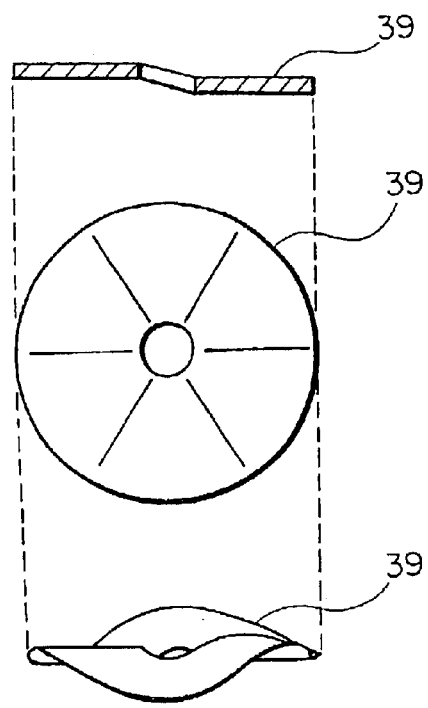
FIG. 10 is a view showing a shape of the spacer employed in the electromagnetic valve according to a third embodiment of the present invention.
Figure 11:
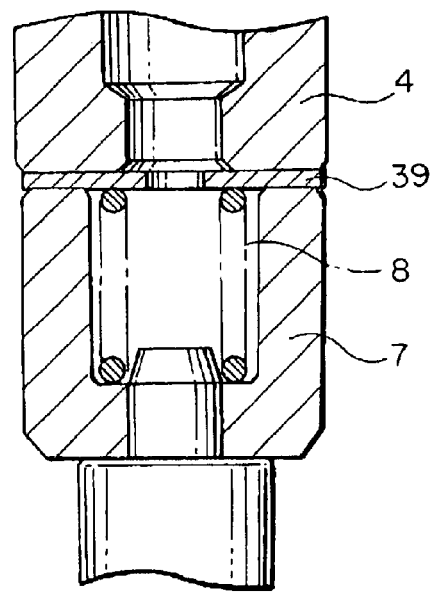
FIG. 11 is an enlarged view showing a portion of the electromagnetic valve according to the third embodiment of the present invention in the vicinity of the spacer in the state where the electromagnetic valve is electrically energized.
Figure 12:
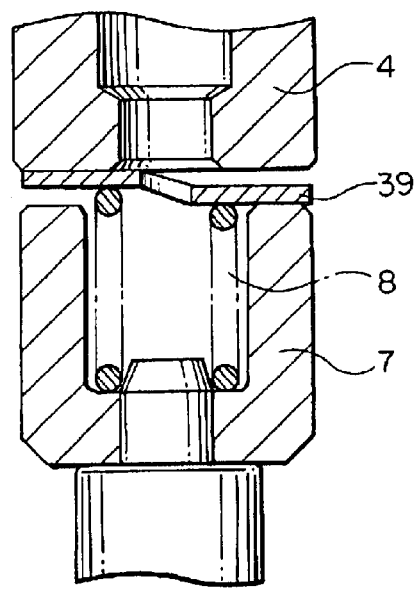
FIG. 12 is an enlarged view showing a portion of the electromagnetic valve according to the third embodiment of the present invention in the vicinity of the spacer in the state where the electromagnetic valve is electrically deenergized.

FIG. 10 is a view showing the shape of a spacer employed in the electromagnetic valve according to a third embodiment of the present invention. FIG. 11 is an enlarged view showing a portion of the electromagnetic valve in the vicinity of the spacer in the state where the electromagnetic valve is electrically energized. FIG. 12 is an enlarged view showing a portion of the electromagnetic valve in the vicinity of the spacer in the state where the electromagnetic valve is electrically deenergized. In the electromagnetic valve according to the instant embodiment of the invention, the spacer denoted by reference numeral 39 is implemented in the form of a washer waved in the circumferential direction. The waved washer may be the one that is conventionally employed when elasticity is to be imparted to the washer. The waved washer can be manufactured at low cost.

By implementing the spacer 39 in the form of the waved washer as mentioned above, the spacer 39 is imparted with elasticity in the direction in which the plunger assembly 15 is moved. Upon electrical energization of the electromagnetic valve, the spacer 39 is compressed to a planar form between the fixed core 4 and the plunger 7 while storing a restoring force. When the plunger 7 is moved away from the fixed core 4, the restoring force of the spacer 39 acts in the direction to separate the plunger 7 and the fixed core 4 from each other. Thus, the plunger 7 can be detached with ease from the spacer 39, whereby the response performance of the electromagnetic valve can correspondingly be enhanced. At this juncture, it is to be added that the combined force of the restoring forces of the spacer 39 and the spring 8 should be smaller than the magnetic attracting force which acts on the plunger 7.

Further, since the waved spacer 39 exhibits a moderate elastic force, the damping effect can be realized, whereby the operation noise can be suppressed.

Embodiment 4

Figure 13:
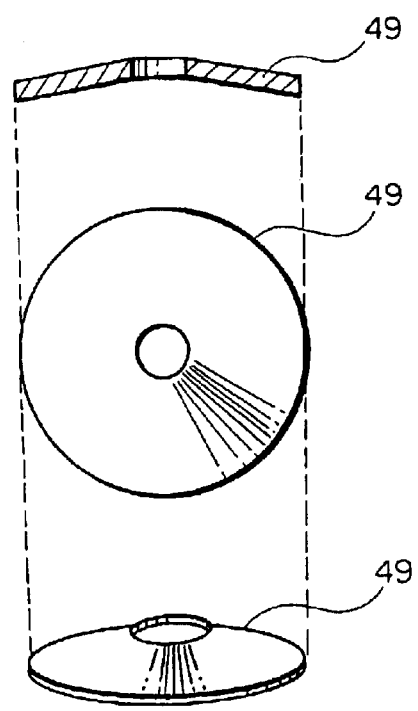
FIG. 13 is a view showing a shape of the spacer employed in the electromagnetic valve according to a fourth embodiment of the present invention.
Figure 14:
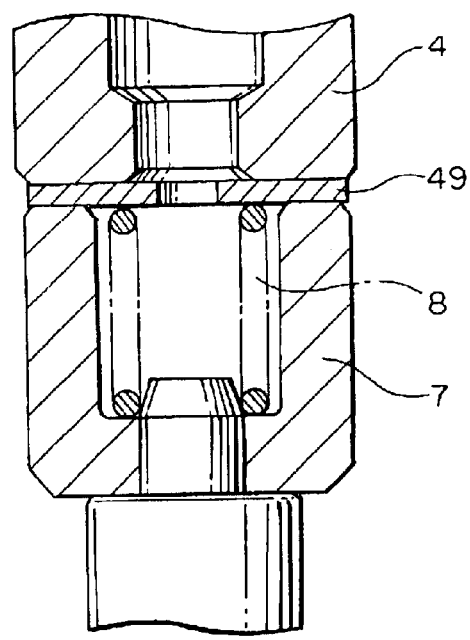
FIG. 14 is an enlarged view showing a portion of the electromagnetic valve according to the fourth embodiment of the present invention in the vicinity of the spacer in the state where the electromagnetic valve is electrically energized.
Figure 15:
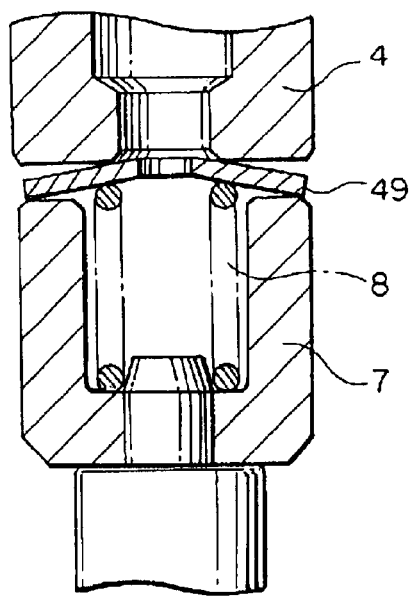
FIG. 15 is an enlarged view showing a portion of the electromagnetic valve according to the fourth embodiment of the present invention in the vicinity of the spacer in the state where the electromagnetic valve is electrically deenergized.

FIG. 13 is a view showing the shape of a spacer employed in the electromagnetic valve according to a fourth embodiment of the present invention. FIG. 14 is an enlarged view showing a portion of the electromagnetic valve in the vicinity of the spacer in the state in which the electromagnetic valve is electrically energized. On the other hand, FIG. 15 shows a portion of the electromagnetic valve in the vicinity of the spacer in the state in which the electromagnetic valve is electrically deenergized. In the electromagnetic valve according to the instant embodiment of the invention, the spacer denoted by reference numeral 49 is implemented in the form of a beveled spring washer. The beveled spring washer is conventionally employed, when elasticity is to be imparted to the washer, as in the case of the waved washer described above. The beveled spring washer can be manufactured or commercially available at low cost.

By implementing the spacer 49 as the beveled spring washer as described above, the bearing surface of the spring 8 assumes a same height level in the circumferential direction, whereby inclination of the spring 8 can be suppressed. Thus, reliable operation can be ensured. Of course, the electromagnetic valve according to the instant embodiment of the invention can enjoy advantageous effects similar to those described hereinbefore in conjunction with the third embodiment of the invention. Many modifications and variations of the present invention are possible in the light of the above techniques. It is therefore to be understood that within the scope of the appended claims, the invention may be practiced otherwise than as specifically described.

What is claimed is:

1. An electromagnetic valve, comprising:
   a valve seat assembly having an intake port, a discharge port, a fluid passage formed between said intake port and said discharge port and a valve seat provided in association with said fluid passage;
   a plunger assembly comprised of a plunger disposed reciprocatively slideably within a cylindrical hollow chamber and a valve element provided at a top end of said plunger for opening and closing said fluid passage in cooperation with said valve seat;
   a coil for driving said plunger to displace said plunger assembly;
   a fixed core disposed in a direction in which said plunger is displaced for attracting said plunger to a retracted position upon electrical energization of said coil to hold said plunger at the retracted position;
   a resilient member disposed in a compressed state between said plunger and said fixed core, when viewed in said direction in which said plunger is displaced, to resiliently urge said plunger assembly to an advanced position; and
   a spacer interposed between said plunger and said fixed core, said spacer being provided with a protrusion.

2. An electromagnetic valve according to claim 1,
   wherein said electromagnetic valve is implemented as a duty control type electromagnetic valve designed for controlling an amount of fluid flowing through said electromagnetic valve by changing time durations of electrical energization and deenergization, respectively, of said coil which are repeated periodically, to thereby change open and close timings, respectively, of said valve.

3. An electromagnetic valve according to claim 1 or 2,
   wherein said spacer provided with the protrusion exhibits elasticity in the direction in which said plunger is displaced.

4. An electromagnetic valve according to any one of claims 1 to 2,
   wherein said spacer is provided as said protrusion with an annular convex portion formed on a surface of said spacer facing opposite to said plunger along a whole circumference of said spacer.

5. The electromagnetic valve according to claim 1,
   wherein said spacer is provided as said protrusion a circular array of a plurality of discrete convex portions formed and disposed in a circumferential direction on a surface of said spacer facing opposite to said plunger.

6. The electromagnetic valve according to claim 1,
   wherein said spacer provided with the protrusion is implemented as a washer of a shape waving in a circumferential direction.

7. An electromagnetic valve according to any one of claims 1 to 2,
   wherein said spacer provided with the protrusion is implemented in the form of a beveled washer.

* * * * *